3,450,499
PREPARATION OF METAL NITRIDES
Paul C. Yates, Wilmington, Del., assignor to E. I. du Pont de Nemours and Company, Wilmington, Del., a corporation of Delaware
No Drawing. Continuation-in-part of application Ser. No. 593,001, Nov. 9, 1966. This application July 17, 1968, Ser. No. 745,374
Int. Cl. C01b 21/06
U.S. Cl. 23—191   7 Claims

ABSTRACT OF THE DISCLOSURE

Nitrides of titanium, aluminum, zirconium, tantalum, hafnium, niobium and vanadium, having exceptional purity and uniformly small particle size, are prepared by contacting a reducible salt or oxide of titanium, aluminum, zirconium, vanadium, niobium, tantalum, hafnium or their mixtures with an alkali metal nitride or alkaline earth metal nitride in a molten salt bath of alkali halides or alkaline earth halides, at a temperature of from 450° C. to 1200° C. The nitrides are useful in preparing metal bonded nitride cutting tools of exceptional strength and hardness.

CROSS-REFERENCE TO RELATED APPLICATIONS

This application is a continuation-in-part of my copending application Ser. No. 593,001, filed Nov. 9, 1966, now U.S. Patent 3,409,418 which in turn is a continuation-in-part of my then copending application Ser. No. 457,468 filed May 20, 1965, now abandoned, which in turn was a continuation-in-part of my then copending application Ser. No. 371,778 filed June 1, 1964, now abandoned. My application Ser. No. 593,001 filed Nov. 9, 1966 is also a continuation-in-part of my then copending application Ser. No. 457,461 filed May 20, 1965, now abandoned, which in turn was a continuation-in-part of my then copending application Ser. No. 371,778 filed June 1, 1964, now abandoned, and my then copending application Ser. No. 371,756 filed June 1, 1964, now abandoned.

BACKGROUND OF THE INVENTION

This invention is related to methods for preparing refractory metal nitrides and more particularly is directed to a method for preparing the nitrides of aluminum, titanium, zirconium, vanadium, niobium, hafnium or tantalum in a molten bath of alkali halides or alkaline earth halides by contacting an oxide or reducible salt of the metal with an alkali metal nitride or an alkaline earth metal nitride at a temperature of between 450 and 1200° C., and optionally in the presence of an alkali metal or alkaline earth metal reducing agent.

It is known that boron nitride can be prepared in a molten salt bath by reaction of a boron-containing material with ammonia, see Litz U.S. Patent No. 2,974,013. However, that process results in low yields of boron nitride and requires the use of gaseous ammonia as the nitriding agent which is inconvenient.

I have discovered that by reacting an oxide or reducible salt of aluminum, titanium, zirconium, vanadium, niobium, hafnium, tantalum or their mixtures with an alkali metal nitride or an alkaline earth metal nitride in a molten bath of an alkali halide or alkaline earth halide, I can obtain the nitrides of aluminum, titanium, zirconium, vanadium, niobium, hafnium, tantalum or their mixtures in yields as high as 96% and higher. Moreover, the process is simple and convenient to operate and the product is exceptionally pure and fine-grained.

SUMMARY

In summary, this invention is directed to the method of preparing nitrides of aluminum, titanium, zirconium, tantalum, hafnium, vanadium, niobium and their mixtures comprising contacting an oxide or reducible salt of aluminum, titanium, zirconium, tantalum, hafnium, vanadium, niobium, or their mixtures with a nitride of an alkali metal, an alkaline earth metal, or their mixtures, in an agitated molten bath of an alkali halide or alkaline earth halide, and optionally in the presence of an alkali metal or alkaline earth metal reducing agent, at a temperature of between 450 and 1200° C., and maintaining the temperature until the reaction is complete. The resultant nitride can be recovered from the fused salt most simply by cooling the bath and dissolving the impurities.

This process results in outstanding yields of the indicated nitrides. Moreover the nitrides are quite pure and have a very uniformly fine particles size, which makes them particularly well suited for use in preparing dense, refractory materials.

DESCRIPTION OF THE INVENTION

Reactants

The reactants suitable for use in this invention comprise an oxide or reducible salt of aluminum, zironcium, vanadium, hafnium, tantalum, niobium or titanium, and a nitride of an alkali metal or alkaline earth metal. The fused salt medium is an alkali metal halide or alkaline earth metal halide and the reducing agent which can optionally be used is an alkali metal or alkaline earth metal.

Metal salts

Representative of suitable oxides and reducible salts of aluminum, zirconium, vanadium, hafnium, tantalum, niobium or titanium are their halides and oxides such as $AlBr_3$, $AlCl_3$, $AlF_3$, $Al_2F_6$, $Al_2O_3$, $ZrBr_4$, $ZrCl_4$, $ZrF_4$, $ZrI_4$, $ZrO_2$, $ZrOBr_2$, $ZrOCl_2$, $ZrOI_2$, $VBr_3$, $VCl_2$, $VCl_3$, $VCl_4$, $VF_3$, $VF_5$, $V_2O_2$, $V_2O_3$, $V_2O_4$, $V_2O_5$, $VOCl$, $VOBr$, $VOBr_2$, $VOBr_3$, $(VO)_2Cl$, $VOCl_2$, $VOCl_3$, $HfO_2$, $TaBr_5$, $TaCl_5$, $TaF_5$, $Ta_2O_2$, $Ta_2O_4$, $Ta_2O_5$, $TiBr_4$, $TiCl_2$, $TiCl_3$, $TiCl_4$, $TiF_3$, $TiF_4$, $TiI_4$, $TiO_2$, $TiO_3$, $Ti_2O_3$, $NbBr_5$, $NbCl_5$, $NbF_5$, $NbO$, $NbO_2$, $NbO_5$, $NbOBr_3$, and $NbOCl_3$. These compounds can be obtained commercially or can be prepared by means known to the art.

As will be recognized by those skilled in the art, the above compounds can be used singly or in admixture, and when mixed will lead to production of a mixed nitride if the salts are of different metals.

Nitrides

Suitable nitrides for reaction with the above salts are the nitrides of the alkali metals and alkaline earth metals such as cesium, lithium, potassium, rubidium, sodium, barium, calcium, magnesium, strontium, and their mixtures. For convenience and economy the nitrides of sodium, lithium, calcium and magnesium are preferred for use in this invention.

These nitrides can be obtained commercially or can be prepared by methods known to the art.

Salt bath

The salts suitable for use as the molten medium are the halides of alkali metals and alkaline earth metals and their mixtures as pointed out above. Generally any of the above salts are suitable which melt but do not boil or decompose at the temperature of reaction. Representative of suitable halides are barium bromide, barium chloride, barium fluorochloride, barium iodide, calcium bromide, calcium chloride, calcium iodide, cesium bromide, cesium chloride, cesium fluoride, cesium iodide, lithium bromide, lithium chloride, lithium fluoride, lithium iodide, magnesium chloride, potassium bromide, potassium chloride, potassium fluoride, potassium iodide, rubidium bromide, rubidium chloride, rubidium fluoride, rubidium iodide, sodium bromide, sodium chloride, sodium fluoride, sodium iodide and strontium chloride. Of these, sodium chloride, lithium chloride, and calcium chloride are frequently preferred for use for reasons of convenience and economy.

Reducing agents

As mentioned above, the reaction can optionally be carried out in the presence of an alkali metal or alkaline earth metal reducing agent. Representative agents are sodium, potassium, lithium, calcium, magnesium, barium and strontium; and sodium, calcium and magnesium are preferred.

Reaction conditions

The reaction is carried out by dispersing the reactants in the molten salt bath with agitation. The reactants can be dispersed in the bath either in suspension or in solution. The agitation of the bath should be sufficiently vigorous to disperse the reactants substantially uniformly throughout the bath as rapidly as the reactants are added.

The reactants can be added either simultaneously or sequentially and either continuously or incrementally. Incremental simultaneous addition of the reactants is often preferred as it facilitates good dispersion of the reactants, avoids a too vigorous reaction, and permits time for heat generated by the exothermic reaction to be dissipated. After addition is complete, the temperature and agitation are maintained until the reaction is substantially complete. The reaction can be carried out over extended periods of time, as long as several days or more, or can be run to completion in a fraction of an hour or even a few minutes, depending on the quantities of reactants and the volume of the fused salt bath.

The reactants, that is the metal oxide or reducible metal salt and the nitride, are used in essentially stoichiometric amounts. However, the amounts used are not critical and can vary from stoichiometric without appreciable adverse effect on the reaction.

The reaction is ordinarily carried out in an inert atmosphere to avoid excessive oxidation of the product. Suitable inert atmospheres such as helium or argon are preferably gettered such as over titanium sponge at 700–800° C. to remove oxygen before passing the gas into the reaction zone.

The reaction temperature can vary between about 450° C. and 1200° C., depending upon the choice of halide salt for the bath and the reactants. For most purposes it is preferable to carry out the reaction at a temperature between 600 and 1100° C.

During the reaction the nitrides being formed may tend to flocculate in the fused salt bath and can be drawn off during the reaction if desired. Normally, however, the product can be recovered most conveniently by quenching the fused salt bath and dissolving both the salt and by-products in a solvent which does not substantially or rapidly attack the nitride products. Representative of suitable solvents are water, alcohols, and water mixed with acids such as hydrochloric and acetic acid.

Alternatively, the nitride product can be recovered by distilling off the salts and by-products at a temperature of from about 1100 to 1400° C. under high vacuum. Such a procedure avoids exposing the nitride product to oxygen.

Products

The nitrides produced by the process of this invention are obtained in outstanding yields, as high as 96% and higher. These nitrides are characterized by good purity and a very uniform fine particle size. While the product may aggregate somewhat during reaction and recovery, the particle size is small as can be demonstrated by nitrogen adsorption techniques and X-ray line broadening measurements.

The products are exceptionally useful in preparing dense, hard, refractory materials such as cutting tools and bits as described in my application Ser. No. 593,001, filed Nov. 9, 1966, my application Ser. No. 580,848, filed Aug. 29, 1966, and my application Ser. No. 593,000, filed Nov. 9, 1966.

The process of this invention is further exemplified in the following examples wherein parts and percentages are by weight unless otherwise noted.

EXAMPLE 1

This example describes the preparation of particulate titanium nitride by a reaction between titanium trichloride and calcium nitride in a bath of molten calcium chloride.

The apparatus used in preparing the titanium nitride consists of a cylinder 4 inches in diameter and 11 inches high, fabricated from $\frac{1}{16}$ inch sheet "Inconel" (80% nickel, 13% chromium, 7% iron). The cylinder is contained in a ¼ inch wall "Duralloy" (65% iron, 20% chromium, 15% nickel) pot provided with a flange to which is bolted a tightly fitting head. Two taper joints are attached to the head. Retort shaped glass bulbs are inserted in the taper joints and the solid powder reactants are dispensed from these bulbs by rotating them in the joints so that the powder spills over into the reactor. A stirrer, made from ½ inch "Inconel" tube with flat blades of "Inconel" welded to the tube, enters the reactor through an asbestos packed bearing. The temperature in the reactor is recorded by means of a thermocouple inserted inside the hollow stirrer shaft. An electrically heated "Calrod" furnace surrounds the pot, the temperature of the furnace being recorded by means of another thermocouple.

Five hundred parts of anhydrous calcium chloride are charged to the reactor and the air in the system is displaced by passing argon, previously gettered over finely divided titanium metal at 800° C., into the reactor, the gas exit being connected to a bubbler. The calcium chloride is melted and the melt brought to 875° C. with good agitation by the mechanical stirrer. Aliquots of the mixed reactants consisting of 15.43 parts of titanium trichloride and 13.83 parts of calcium nitride are charged at 5 minute intervals to the reactor by manipulating the addition bulbs and controlling the rate of addition by observing the heat evolved, as recorded by the stirrer thermocouple. The temperature is maintained in the range of 875 to 925° C. during the reaction, the addition being completed over a period of 80 minutes. A total of ten aliquots are added during this time. The melt is kept at 875 to 900° C. with stirring, for a total period of one hour. Then, after raising the stirrer from the melt, the salt is allowed to cool to room temperature under argon. The solidified salt cake is broken up and pulverized.

The crushed salt cake is stirred with ice water, until the calcium chloride is dissolved. The product is then washed until it is free of chloride ion by suspending in distilled water and centrifuging through a Sharpless Supercentrifuge. This requires five washes, using 10,000 parts of water per wash. After the product is free of chloride ion, it is dried in a vacuum oven to give a titanium nitride colloidal powder. 118 parts representing 96% of the theoretical yield for this reaction are recovered. Examination of the product by X-ray diffraction indicates it to be titanium nitride, and chemical analysis shows that it contains about 1% oxygen as a major impurity, along with traces of iron, chromium, and nickel in the parts per million range, presumably originating from the "Inconel" equipment used for the synthesis.

X-ray line broadening measurements and nitrogen surface determinations indicate the crystal size of the titanium nitride crystals to be approximately 55 millimicrons.

EXAMPLE 2

The apparatus of Example 1 is employed to prepare colloidal zirconium nitride according to the equation:

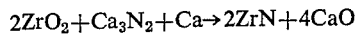

$$2ZrO_2 + Ca_3N_2 + Ca \rightarrow 2ZrN + 4CaO$$

One thousand parts of anhydrous calcium chloride are loaded into the reactor and melted, and the reactor temperature is adjusted to 900° C. Aliquots of 7.4 parts of calcium nitride and 12.3 parts of finely divided zirconium oxide, along with 2 parts of calcium metal are introduced as increments into the stirred molten calcium chloride at time intervals of about 15 minutes each. After each addition, the temperature of the reactor rises momentarily as a result of the exothermic character of the reaction. The heat is cut back to allow the temperature to return to 900° between each incremental addition.

After 20 such additions, the reactor is stirred at 900° C. for one hour, and the salt, containing the colloidal zirconium nitride, is then frozen and the product recovered as described in Example 1, with the addition of sufficient concentrated hydrochloric acid in the first two washing steps to dissolve the calcium oxide by-product. The product is a fine, lemon-yellow, collodial powder, which X-ray diffraction and chemical analysis show to be ZrN containing about 1.5% oxygen as the only major impurity. One hundred ninety parts are recovered, representing a yield of about 90.5% of the theoretical yield.

X-ray line broadening and surface area measurements show the particle diameter to be about 30 millimicrons.

EXAMPLE 3

The procedures and equipment of Example 1 are employed to prepare niobium nitride by the following reaction:

$$NbCl_3 + Na_3N \rightarrow NbN + 3NaCl$$

Increments of 1/20 of a mole of niobium chloride and 1/20 of a mole of sodium nitride and one part by weight of sodium metal are made to a melt containing 500 parts of sodium chloride maintained at 700° C. with intervals of 10 minutes between additions. Stirring is continued for an hour after completion of twenty such additions.

After freezing the salt, the excess sodium is cautiously consumed by reaction with ethanol and the product is recovered as described in Example 1.

X-ray, nitrogen surface area, and chemical analyses show the product to be 20 millimicron particles of niobium nitride, containing approximately 0.5% oxygen as an impurity. The yield obtained is 88% of the stoichiometric yield expected for the reaction.

EXAMPLE 4

The procedures and equipment of Example 2 are employed to produce tantalum nitride according to the reaction:

$$3Ta_2O_3 + 2Ca_3N_2 + 11Ca \rightarrow 6TaN + 15CaO$$

Increments of 3/50, 2/50, and 11/50 of a mole of each of the reactants are introduced over 20-minute intervals to 1000 parts by weight of molten anhydrous calcium chloride maintained at 1000° C. Following 25 such additions, the reaction is stirred for an hour and the salt frozen and the product recovered as in Example 2.

The product obtained is colloidal tantalum nitride of 25 millimicron average patricle diameter. The major impurity is 0.3% oxygen. Chemical composition and product identity are established by chemical analysis, X-ray line broadening, X-ray diffraction, and nitrogen surface area as in previous examples.

The yield is 93% of the theoretical yield according to the synthesis equation written above.

I claim:
1. The process for preparing refractory metal nitrides comprising contacting a compound selected from the group consisting of the oxides and reducible salts of a metal selected from the group consisting of titanium, aluminum, zirconium, tantalum, hafnium, vanadium, niobium and their mixtures, with a nitride selected from the group consisting of the alkali metal nitrides and alkaline earth metal nitrides in an agitated molten salt selected from the group consisting of alkali metal halides and alkaline earth metal halides at a temperature of from 450 to 1200° C., and maintaining said temperature and agitation until the reaction of the metal of the reducible metal salt with the nitride is susbtantially complete.

2. The process of claim 1 in which the reaction is carried out in the presence of a reducing agent selected from the group consisting of the alkali metals and alkaline earth metals.

3. The process of claim 1 in which the reaction is carried out at a temperature between 600 and 1100° C.

4. The process of claim 1 in which the reactant compound of aluminum, titanium, zirconium, tantalum, hafnium, vanadium, niobium or their mixtures is selected from the oxides and halides of these metals.

5. The process of claim 1 in which the reactant nitride is selected from the group consisting of the nitrides of sodium, lithium, calcium and magnesium.

6. The process of claim 1 in which the molten salt is selected from the group consisting of sodium chloride, lithium chloride and calcium chloride.

7. The process of claim 2 in which the reaction is carried out at a temperature between 600 and 1100° C.

References Cited

UNITED STATES PATENTS 2,461,020  2/1949  Alexander _____ 23—191
2,974,013  3/1961  Litz _____ 23—191

FOREIGN PATENTS 543,990  7/1957  Canada.

OSCAR R. VERTIZ, Primary Examiner.

G. O. PETERS, Assistant Examiner.